Sept. 26, 1944.   C. P. BERGSTROM ET AL   2,358,904
INDEXING MACHINE
Filed Nov. 16, 1942   3 Sheets-Sheet 1
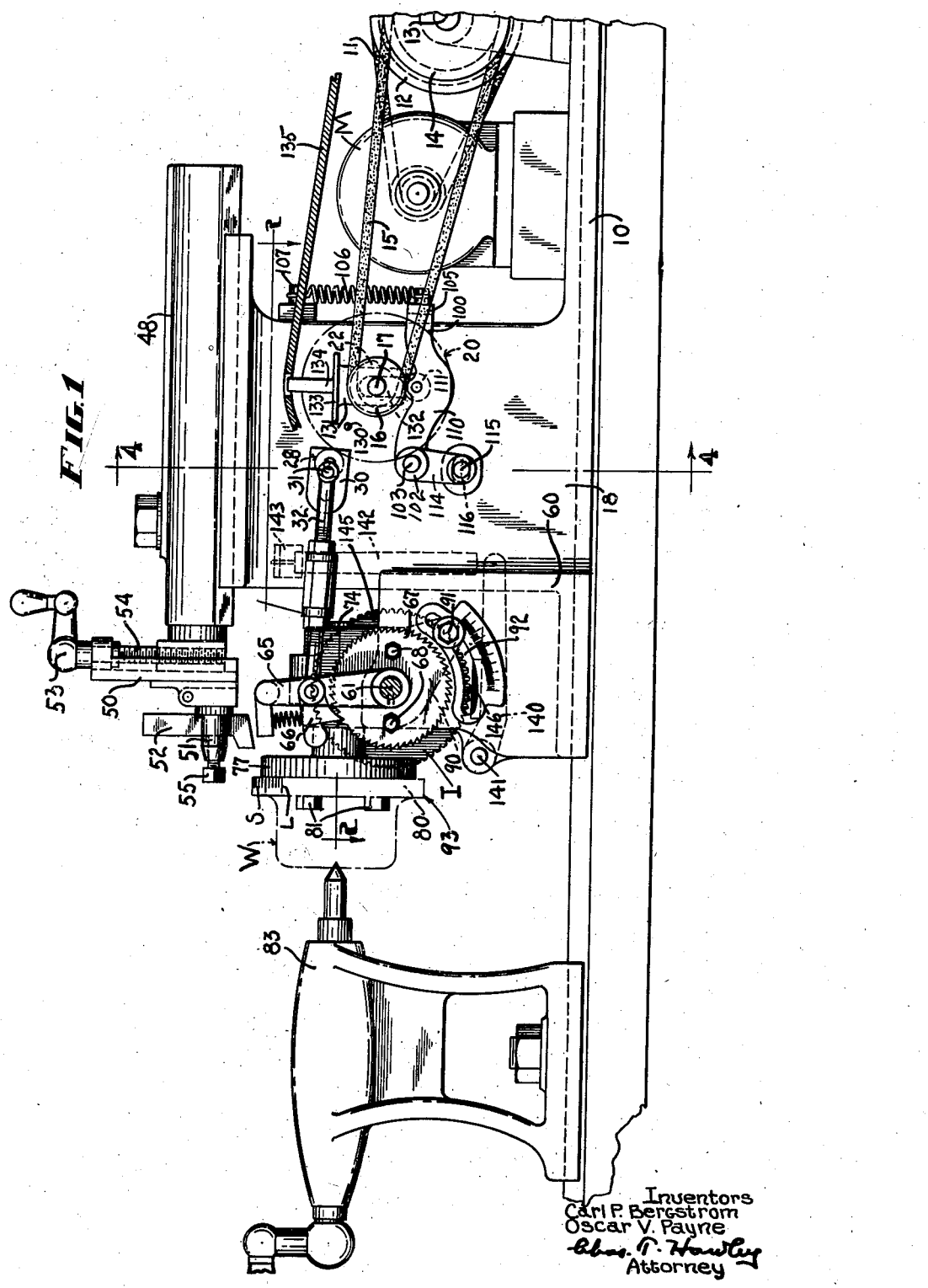
Inventors
Carl P. Bergstrom
Oscar V. Payne
Attorney

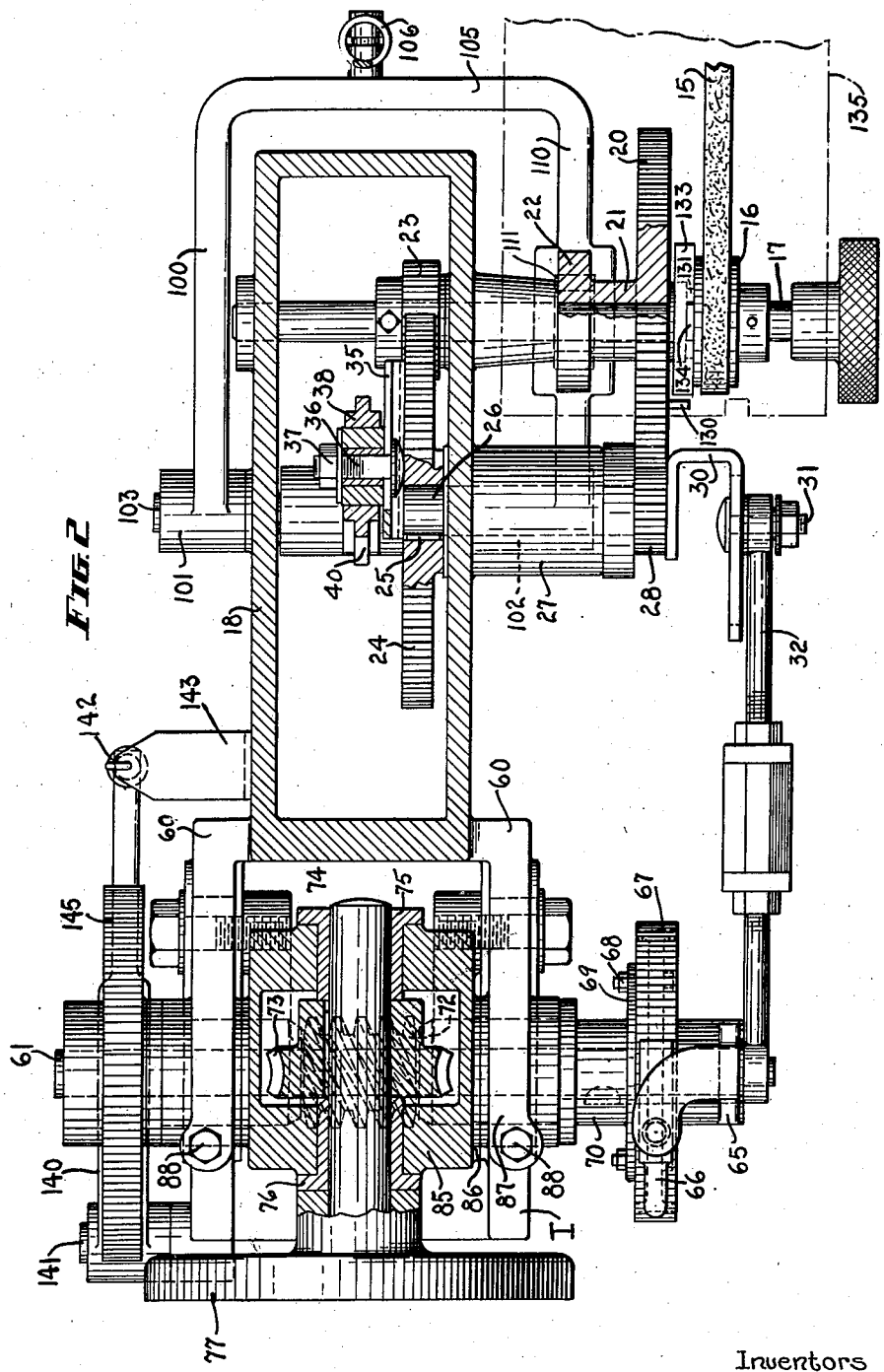

Sept. 26, 1944. C. P. BERGSTROM ET AL 2,358,904
INDEXING MACHINE
Filed Nov. 16, 1942 3 Sheets-Sheet 3
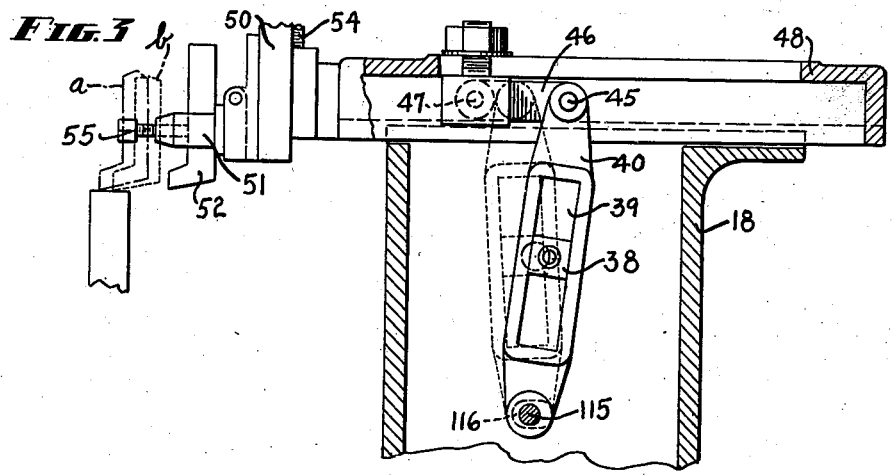
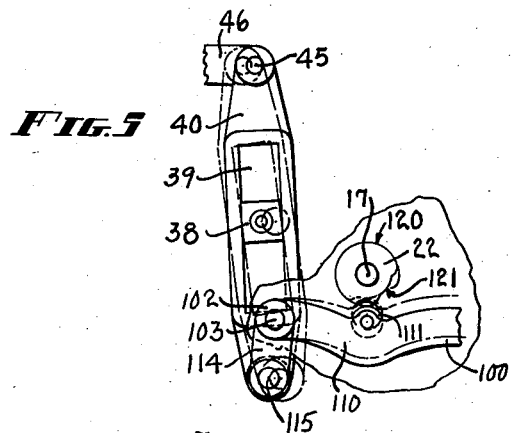
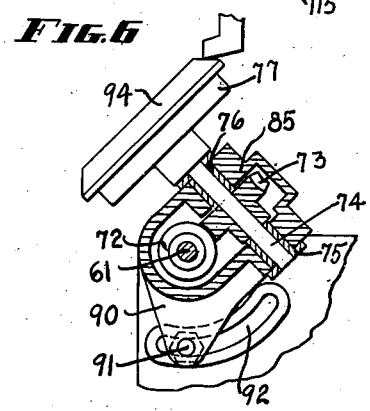
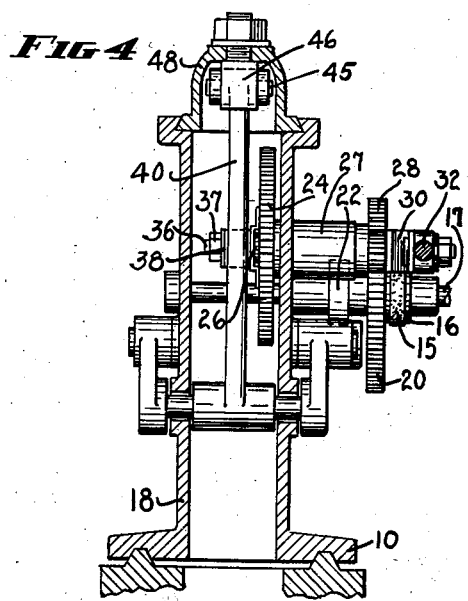
Inventor
Carl P. Bergstrom
Oscar V. Payne
Attorney Patented Sept. 26, 1944

2,358,904

UNITED STATES PATENT OFFICE 2,358,904

INDEXING MACHINE

Carl P. Bergstrom, Millbury, and Oscar V. Payne, Leicester, Mass., assignors to Crompton & Knowles Loom Works, Worcester, Mass., a corporation of Massachusetts Application November 16, 1942, Serial No. 465,720

12 Claims. (Cl. 33—19)

This invention relates to indexing machines for graduating collars, sleeves, disks, etc., usable on such machine tools as lathes, milling machines and the like, and it is the general object of the invention to provide simple means by which long and short graduations may be cut automatically.

Many machines in addition to those already mentioned employ a graduated circular surface on a rotatable part in which an angular movement equivalent to the distances between graduations corresponds either to a predetermined linear or circular movement. To facilitate reading it is customary to elongate the graduations at regularly recurring intervals, such as one in five. Because of the necessity for cutting graduations of two different lengths it has been customary in the past to index and scribe the graduations by hand.

It is an important object of our present invention to provide a scribing or cutting head actuated by a regularly moving part, such as a crank, and change the range of movement of the head relatively to the work toward and from the latter at periodic intervals, such as every fifth stroke of the head. The work is moved transversely of the cutting stroke in a step-by-step movement between cutting operations to space the graduations.

It is another object of our present invention to provide a reciprocating tool carrying head driven by a lever an intermediate part of which has a given amplitude of motion together with a pivot for that end of the lever opposite the head so controlled as to shift the range of the cutting stroke relatively to the work whenever a long graduation is desired. In this way the cutting part of the stroke of the tool head is lengthened periodically without requiring a change in the stroke of its actuator.

The graduations generally start with a long cut to be followed by several shorter cuts, such as four, after which a long cut is again produced. In order that the start of the indexing operation may always start with a long cut it is a further object of our present invention to provide a visual signal which by its position indicates when the machine is set to make a long stroke. If set for a short stroke the machine may be turned by hand until the signal is in position corresponding to a long stroke.

With these and other objects in view which will appear as our description proceeds, our invention resides in the combination and arrangement of parts hereinafter described and set forth.

In the accompanying drawings, wherein a convenient embodiment of our invention is set forth, Fig. 1 is a side elevation of a machine made according to our present invention, arranged to index a cylindrical surface, Fig. 2 is a horizontal section on line 2—2 of Fig. 1 on an enlarged scale, Fig. 3 is a vertical section through the upper part of Fig. 1 showing the operating lever for the scribing head, Fig. 4 is a vertical section on line 4—4 of Fig. 1, Fig. 5 is a view similar to a portion of Fig. 3 but showing the lever in the two positions it assumes to change the cutting range, and Fig. 6 is a vertical section through a portion of the indexing head shown in Fig. 1 in position for cutting graduations on a conical surface.

Referring particularly to Figs. 1 and 2, the machine comprises a base 10 on which is mounted a motor M connected by belt 11 and pulley 12 to a counter shaft 13 to which is secured a second pulley 14. A belt 15 leading from pulley 14 drives a small pulley 16 secured to the main shaft 17 of the machine which is journaled in and extends through a housing 18 which may be of rectangular form as shown in Fig. 2 and formed as part of the base 10.

A large gear 20 is mounted loosely for rotation on shaft 17 and has a hub 21 formed integrally with a cam 22. Within the housing 18 the shaft 17 has secured thereto a pinion 23 which meshes with a gear 24 keyed as at 25 to a stub shaft 26 extending forwardly through a bearing 27 on the front wall of the housing and having secured to the forward end thereof a pinion 28 meshing with the large gear 20. The ratio of the gear 20 and pinion 28 may conveniently be five to one, and the pinion is provided with a crank 30 carrying a driving pin 31 adjustable therealong and having pivoted thereon the right end of a driving rod 32, see Figs. 1 and 2. The pinion 23 and gear 24 provide a speed reduction between the pulley 16 and the pinion 28 and this reduction may be of any desired ratio not dependent upon the relative sizes of gear 20 and the pinion 28.

The gear 24 is provided with radially extending ways 35 along which is adjusted a bolt 36 held in position by a nut 37. The bolt is ordinarily eccentric with respect to the stud 26 and passes through a block 38, see Figs. 3 and 4, which is slidable in a longitudinal slot 39 of an actuating lever 40. The bolt 36 provides means by which the actuating lever is rocked from the full to the dotted line position shown in Fig. 3 as the gear 24 makes a half revolution.

The upper end of the actuator lever is pivoted as at 45 to a link 46 pivoted at 47 to a sliding tool carrying head 48 mounted on and guided by the top of the rectangular housing 18 The left end of the head as shown in Fig. 3 is provided with a tool carrier 50 to which is pivoted a tool post 51 carrying the scribing or graduating tool 52 the lower end of which is preferably formed with a small V-shaped cutting edge. A handle 53 on a vertical screw 54 mounted on the head 48 and controlling the tool carrier 50 provides means for raising and lowering the tool post, and a screw 55 holds the tool 52 in the post.

The collar or other piece of work W to be operated upon is held in an indexing head I shown in Fig. 1 and in section in Fig. 2. This head comprises a bearing stand 60 fastened to an end wall of the housing and affording support for a shaft 61. The forward end of the shaft has loosely mounted thereon a feed lever 65 connected to the left end of the driving rod 32 as viewed in Fig. 1 to rock back and forth as the pinion 28 rotates. A feed pawl 66 is pivoted on the lever 65 and operates a ratchet wheel 67 bolted as at 68 to a flange 69 the hub 70 of which is keyed to shaft 61.

Within the indexing head I the shaft 61 has secured thereto a worm 72 which meshes with a worm gear 73 keyed to a shaft 74 rotatable in right and left sleeves 75 and 76, respectively, as seen in Fig. 2. A face plate 77 is secured to the shaft 74 to have secured thereto the collar or other piece of work to be graduated. As shown in Fig. 1 the work to be operated on has a cylindrical flange 80 held by bolts 81 to the face plate 77. When the work to be operated on is large and requires additional support the tail stock 83 may be used. Sleeves or bushings 75 and 76 are eccentric and can be turned to take up lost motion between the worm and its gear.

The shaft 74, sleeves 75 and 76, and worm wheel 73 are carried by a cradle 85 mounted for angular movement on bushings 86 held in the bearing stand 60 and through which passes shaft 61. The bushings are located in split bearings 87 on stand 60 and are held clamped in their bearings by bolts 88. The bushings therefore serve as bearings for both the cradle and shaft 61. A depending arm 90 integral with the cradle carries a bolt 91 which passes through a slot 92 concentric with shaft 61 and formed in the bearing stand 60. The bolt holds the cradle in adjusted angular position relatively to the stand 60. When the surface to be graduated is cylindrical as shown at 93 in Fig. 1 the shaft 74 will be horizontal, but if the work has a conical surface 94 as in Fig. 6, the cradle will be rocked and clamped at the proper angle by bolt 91. Graduations on stand 60 at the side of slot 92 enable the operator to determine the angle at which shaft 74 should be inclined.

As shown in Fig. 1 the graduations on surface 93 of flange 80 are both long and short, a long graduation L occurring at regular intervals with the short graduation S therebetween. In order that the cutting tool and the head to which it is secured may be controlled for cutting both the long and short graduations we provide means for changing the location of the pivot at the lower end of the actuator lever 40. In carrying this feature of our invention into effect we provide a U-shaped lever 100 having hubs 101 and 102 on opposite sides of the housing 18. These hubs are mounted on aligned studs 103 carried by the housing and supply the axis around which the lever 100 rocks. The cross bar 105 of the lever is connected to the lower end of a heavy tension spring 106 the upper end of which is attached to a stationary stud 107 on the housing 18.

The front side arm 110 of the lever 100 has rotatably mounted thereon a roll 111 for engagement with the cam 22. Each hub 101 and 102 is provided with a short depending arm 114 and a rod 115 secured to the two arms 114 extends through horizontal slots 116 in the side walls of the housing 18. Rod 115 provides the pivotal support for the lower end of the actuator lever 40 and its position determines whether short or long graduations are to be cut. The cam 22 has a long high dwell 120 corresponding in the present instance to approximately ⅘ of its periphery and a low dwell 121.

In operation, the gearing already described causes the pawl 66 to give shaft 61 and worm 72 a counter-clockwise angular movement as viewed in Fig. 1 for every stroke of the machine and the worm 72, acting through the worm gear 73, turns the shaft 74 to cause the work to be fed angularly with a step by step movement. The number of teeth on the ratchet wheel 67 will determine the number of steps required to effect the complete rotation of the flange 77 and the work carried by it. The ratchet is replaceable with other ratchets having a different number of teeth and it is for this reason that the ratchet wheel is detachably mounted on the plate 69.

At the start of the cutting operation when it is desired to cut a long stroke L the machine will be turned manually to locate the low dwell 121 over the roll 111, thereby permitting the spring 106 to rock the lever 110 in a counter-clockwise direction as viewed in Fig. 1 to move the rod 115 to the right, or to the dot and dash line position shown in Fig. 5. With the fulcrum of lever 40 thus moved to the right, the driving block 38 will move the head 48 to its extreme left position indicated by the dot and dash line position a of the tool in Fig. 3. After the long graduation has thus been cut the head 48 will move to the right, but before it has its next motion to the left the high dwell 120 will depress the roll 111, thereby moving the rod 115 to the left, or to the full line position shown in Fig. 5. The range of movement of the head is therefore shifted to the right and the tool moves only to the dotted line position b to cut a short graduation S on its next stroke.

After the required number of the short graduations are cut, four in the present instance, during which time the high dwell controls lever 100, the low dwell 121 will again arrive over roll 111, whereupon the operations already described will be repeated. Thus it is that as the shaft 17 continues to rotate, the tool 52 will move to the position a of Fig. 3 every fifth movement of the head 48 to the left and will move only to the position b on the intervening four strokes.

For the practical operation of the machine it is desirable that the operator know how cam 22 is set, that is, whether it is in a position to cause a long or a short cut. In order that a visual indication may be provided for this purpose we secure a lifter pin 130 on the gear 20 and provide a light sheet metal indicator or signal having a lower arm 131 slotted as at 132 to fit around shaft 17 and provided with a shelf 133 lying in the path of the pin 130. An upright stem 134 the top of which is distinctively colored extends through and is guided by a guard 135 held to the housing 18 to protect the operator from contact with the driving belts.

The position of pin 130 is such with respect to low dwell 121 of the cam that the shelf 133 will be lifted to elevate the stem 134 above the guard 135 during that fifth of the rotation of the gear 20 corresponding to a long cut L. For the remaining ⅘ of the rotation of shaft 20 the pin will be too low to engage the shelf and the visual indicator will therefore be down and hidden by guard 135. While specifying that the visual indicator is up ⅕ of the time and down ⅘ of the time to correspond to the order in which the long and short graduations are cut, we are not limited to this ratio, but it is convenient to have the stem 134 visible whenever the machine is set to cut a long line L.

When the work to be graduated is large and heavy enough to require use of the tail stock, it may be advantageous to employ a check to prevent accidental angular movement of the shaft 61. For this purpose we provide a lever 140 pivoted at 141 to the machine frame and having the free end pulled upwardly by a heavy tension spring 142 the top of which is fixed to a clip 143 on the housing 18, see Figs. 1 and 2. A notched check wheel 145 secured to the shaft 61 receives a detent 146 on the lever. As the pawl 66 positively moves the shaft 61 the detent moves from one notch to the next notch and operates to prevent turning of the work on the idle or return stroke of the pawl. Where the fit of the parts is close we find it unnecessary to use the check wheel.

From the foregoing it will be seen that we have provided a simple machine for indexing or graduating surfaces which move transversely of a path traversed by the cutting tool, and that we have produced the long and short graduations by effecting a relative movement between the work and the range of movement of the cutting tool. It will further be seen that we employ an actuating lever for the tool which receives a given stroke from the driver or the like and moves the lever about a center which shifts to two different positions one of which causes the tool to cut the long graduations and the other of which causes the cutting of the short graduations. It will also be seen that we coordinate the step by step transverse movement of the work with the working stroke of the cutting tool by means of a cam or the like which moves with the train of gearing which drives the machine and controls a shifter for the lever pivot. It will further be noted that a signal gives visual indication when the machine is set to cut a long graduation. The eccentric bushings 75 and 76 afford means for taking up wear between the worm and its gear for the purpose of keeping these parts always in tight driving relation with respect to each other. A further important feature resides in the fact that the shaft 74 can be adjusted angularly so that conical surfaces can be graduated. All of the operations of the machine are automatic and the scribing of the long and short graduations proceeds during continued running of the machine without requiring constant attention from the attendant.

Having thus described our invention it will be seen that changes and modifications may be made therein by those skilled in the art without departing from the spirit and scope of the invention and we do not wish to be limited to the details herein disclosed, but what we claim is:

1. In an indexing machine to scribe long and short marks on the surface of a body to be indexed, a scribing tool and carrier therefor, means to mount the carrier for sliding reciprocating movement along a given path, feeding means to move said body by a step by step movement transversely of said path to present different portions of said surface to the scribing tool, a lever connected to said carrier, an actuator moving through a constant range of motion to rock said lever, and mechanism operating in timed relation with said feeding means to change the locus of movement of said lever to cause the carrier and scribing tool to move through one range of motion for certain transverse positions of said surface relatively to said path to cause the tool to cut short marks in said surface and cause said lever to move said carrier and tool through another range of motion to cause said tool to cut longer marks in said surface for certain other transverse positions of said surface relatively to said path.

2. In an indexing machine to scribe long and short marks on the surface of a body to be indexed, a scribing tool movable along a given path to cut long and short marks in said surface, feeding means to give the body a step by step movement transversely of said path to present different portions of said surface to the tool, a carrier for said tool guided for reciprocation along a rectilinear path toward and from said body, a lever operatively connected at one end to said carrier, an actuator having a fixed range of motion acting on said lever to move the latter, a pivot for the other end of said lever, and means operating in time relation relatively to said feeding means to shift the position of the last named pivot to change the locus of movement of said lever and cause said lever to move the carrier and tool through one range along said path for certain transverse positions of said surface with respect to the path to cut short marks in said surface and move said carrier and tool through a different range closer to said body when said pivot is shifted to cause said tool to move through a range closer to said body to cut longer marks in said surface for certain other transverse positions of said surface relatively to said path.

3. In an indexing machine to scribe long and short marks on the surface of a body to be indexed, a scribing tool movable along a given path to cut long and short marks in said surface, feeding means to give the body a step by step movement transversely of said path to present different portions of said surface to the tool, a carrier for said tool guided for reciprocation along a rectilinear path toward and from said body, a lever operably connected at one end thereof to said carrier, a driving shaft, a crank thereon operatively connected to the lever and moving through a fixed range to oscillate said lever, a pinion secured to said shaft, a gear meshing with said pinion, a cam secured to and rotating with the gear, and means operated by the cam and connected to the other end of said lever to change the location of said other end periodically to cause said crank to effect movement of the tool through different ranges of motion along said path to cut said long and short marks.

4. In an indexing machine to scribe long and short marks on the surface of a body to be indexed, a scribing tool movable along a given path to cut long and short marks in said surface, feeding means to give the body a step by step movement transversely of said path to present different portions of said surface to the tool, a carrier for said tool guided for reciprocation along a rectilinear path toward and from said body, a driving lever operably connected at one end thereof to said carrier, a constantly rotating crank operatively connected to the lever to oscillate the latter, a pinion turning with the crank, a gear meshing with the pinion, a cam rotated by said gear, a positioning lever connected to the other end of said driving lever and operated by said cam to move said other end of the driving lever at periodic intervals and cooperate the said crank to cause the tool to move through different ranges of motion along said path to cut said long and short marks.

5. In an indexing machine to scribe long and short marks on the surface of a body to be indexed, a scribing tool movable along a given path to cut long and short marks in said surface, feeding means to give the body a step by step movement transversely of said path to present different portions of said surface to the tool, a carrier for said tool guided for reciprocation along a rectilinear path toward and from said body, a driving lever operably connected at one end thereof to said carrier, a rotating crank operatively connected to the lever, a pinion rotating with said crank and operatively connected to said feeding means to operate the latter, a gear meshing with said pinion, and mechanism operated by said gear due to rotation thereof by the pinion and operatively connected to the other end of said driving lever to shift the latter and cooperate with the crank to cause the tool to move along said path through different ranges of motion to cut the long and short marks.

6. In an indexing machine to scribe long and short marks on the surface of a body to be indexed, a scribing tool movable along a given path to cut long and short marks in said surface, feeding means to give the body a step by step movement transversely of said path to present different portions of said surface to the tool, a carrier for said tool guided for reciprocation along a rectilinear path toward and from said body, a driving lever operably connected at one end thereof to said carrier, a rotating member having a sliding and driving relation with respect to said lever to oscillate the latter, a pinion rotating with said member and having a rotation for each complete oscillation of the driving lever, a gear meshing with the pinion, and positioning mechanism operatively connected to the other end of said driving lever and operated by said gear due to rotation thereof to shift the position of said other end of said driving lever and cooperate with said member to cause the tool carrier and tool to move through different ranges of motion along said path to scribe the long and short marks, the ratio of the number of teeth on said pinion and gear meshing therewith determining the frequency with which the long marks are made with respect to the short marks.

7. In an indexing machine having a scribing tool element movable along a given path to scribe long and short marks on a body element which moves transversely of said path with a step by step movement, a rotating actuator, a rocking member operatively connected to said actuator and caused by said actuator to rock back and forth as the actuator rotates, connections between one end of said rocking member and one of said elements, and positioning means operating in timed relation with said actuator to locate the other end of said rocking member in two different positions, said positioning means when locating said other end in one position thereof causing said actuator and rocking member to move said one element through one range of motion along said given path to cause the tool element to cut short marks on the body element and when locating said other end of said member in the other position thereof causing said actuator and member to move said one element through a different range of motion along said given path to cause said tool element to cut long marks on said body element.

8. In an indexing machine having a scribing tool movable along a given path to scribe long and short marks on a body which moves transversely of said path with a step by step movement, a rotating actuator, a rocking member operatively connected to said actuator and caused by said actuator to rock back and forth as said actuator rotates, connections between one end of said member and said scribing tool, and positioning means operating in timed relation with said rotating actuator to locate the other end of said rocking member in two different positions, said positioning means when locating said other end in one of the positions thereof causing said actuator and member to move said scribing tool through one range of motion along said path to cut short marks on said body and when locating said other end in the other position thereof causing said actuator and member to move said scribing tool through a different range of motion along said path to cut long marks on said body.

9. In an indexing machine having a scribing tool movable along a given path to scribe long and short marks on a body which moves transversely of said path with a step by step movement, an actuator moving in a fixed path, a rocking member operatively connected to said actuator and caused to rock back and forth by said actuator as the latter moves in said fixed path, connections between one end of said member and said tool, and positioning means operating in timed relation with said actuator to locate the other end of said member in two different positions, said positioning means when locating said other end in one position thereof causing said actuator and member to move said tool through one range of motion along said given path to cut short marks on said body and when locating said other end in the other position thereof causing said actuator and member to move said tool through a different range of motion along said given path to cut long marks on said body.

10. In an indexing machine having a scribing tool movable along a given path to scribe long and short marks on a body which moves transversely of said given path with a step by step movement, a rotating actuator, a rocking member operatively connected intermediate the ends thereof to said actuator and caused to rock back and forth by the actuator as the latter rotates, said member having one end thereof operatively connected to said tool, and positioning means operating in timed relation with said actuator to locate the other end of said member in two different positions, said positioning means when locating said other end in one position thereof causing said actuator and member to move said tool through one range of motion along said given path to cut short marks on said body and when locating said other end in the other position thereof causing said actuator and member to move said tool through a different range of motion along said given path to cut long marks on said body.

11. In an indexing machine for automatically scribing lines of different lengths on the surface of a body member to be indexed, a regularly moving driver, a scribing tool, an actuator for the tool connected to the driver and caused by the latter to give said tool scribing strokes while in engagement with said body, feeding mechanism connected to the driver and caused by the latter to move said body at regular intervals to move said surface transversely of the direction of said strokes of said tool with a step by step motion, means constituting a movable pivot for said actuator, and positioning mechanism operatively connected to said means and operating in timed relation with said feeding mechanism to move said pivot from one position thereof to another position thereof and thereby cause said actuator to vary the length of said scribing strokes and cause said tool to scribe lines of different lengths on said surface.

12. In an indexing machine for automatically scribing lines of different lengths on the surface of a body member to be indexed, a scribing tool, an oscillating actuator to reciprocate said tool along a path toward and from said body to cause said tool to scribe lines on said surface, feeding mechanism for said body to give said surface a step by step motion transversely of said path, means constituting a movable pivot for said actuator, and controller mechanism operatively connected to said means and operating in timed relation with said feeding mechanism to move said pivot to different positions, said pivot when in the different positions thereof causing said actuator to move through different ranges of motion and move said tool along said path toward said body to different stopping points preparatory to movement of the tool away from said body for different positions of said surface transversely of said path to cause said tool to scribe lines of different lengths on said surface, each different position of said pivot corresponding to a different stopping point.

CARL P. BERGSTROM.
OSCAR V. PAYNE.